United States Patent [19]

Jenkins et al.

[11] 4,457,010
[45] Jun. 26, 1984

[54] CASSETTE-GRID HOLDING APPARATUS

[75] Inventors: John L. Jenkins, Mentor, Ohio; Larry L. Pierce; June S. Pierce, both of Douglasville, Ga.

[73] Assignee: Picker International, Inc., Cleveland, Ohio

[21] Appl. No.: 292,035

[22] Filed: Aug. 11, 1981

[51] Int. Cl.³ .............................................. G03B 41/16
[52] U.S. Cl. ........................................ 378/167; 378/210
[58] Field of Search ........................ 378/154, 167, 181

[56] References Cited

U.S. PATENT DOCUMENTS 4,132,897 1/1979 Olson ................................ 378/167
4,247,778 1/1981 Waerve ............................. 378/181

*Primary Examiner*—Craig E. Church
*Attorney, Agent, or Firm*—Watts, Hoffman, Fisher & Heinke Co.

[57] ABSTRACT

An apparatus for holding x-ray cassettes and grids in which any grid of a specific length and width can be combined with any cassette of a corresponding length and width without regard to the cassette thickness. The apparatus includes a frame assembly having side rails with flanges and a back rail with flanges which form two channels, one for the grid and one for the cassette. The cassette channel is dimensioned to accept any thickness of cassette. Parabolic springs are located within side rail cassette channel portions to bias the cassette against selected flanges. Locater members are also provided to properly align the grid and the cassette.

9 Claims, 6 Drawing Figures

CASSETTE-GRID HOLDING APPARATUS

TECHNICAL FIELD

The present invention relates to x-ray grids and cassettes and is particularly directed to an apparatus for holding a grid of a specific size and for holding a cassette of corresponding size independent of the thickness of the cassette.

BACKGROUND ART

In medical radiography, x-ray films are used to produce shadow images of patients. When a radiograph is taken the film is positioned between two fluorescent sheets known as intensifying screens and the screens and film are positioned inside a device known as a cassette. The cassette clamps the screens into intimate surface contact with the respective and opposed surfaces of the film. The cassette is light-tight to prevent exposure of the film by ambient light.

In many radiographic studies, a cassette is positioned in a receptor such as a Bucky tray or a spot filmer. Spot filmer and Bucky assemblies are typically equipped with devices known as grids. A grid includes a series of parallel spaced bars of lead or other radiation absorbing material and is positioned between the patient and the film being exposed. The grid permits the passage of primary radiation to produce a shadow image but absorbs so-called scatter radiation which results from refraction of primary radiation. Scatter radiation will, in the absence of the grid, blur the radiographic image.

If a radiograph is to be taken of a patient with a film positioned either in a Bucky or a spot filmer it is necessary first to position the patient on a patient support surface of an x-ray table. There are occasions, such as in a hospital emergency room, when the patient should not be moved for radiographic purposes. For example, it may be very important to determine the extent of an accident victim's injuries before the victim is moved from a stretcher. In that situation, an x-ray technician will simply slide the cassette under a patient and bring an x-ray tube over the patient to take the radiograph.

A prior art portable grid cassette holder for use in an emergency room or the like typically has a grid permanently welded or riveted to a cassette receiving channel. The receiving channel is fixed and will receive only a cassette of a given longitudinal and transverse dimensions and of a specific thickness. Thus the cassette holder will often only be useable with one particular brand of cassette and perhaps only one model.

Most hospitals and clinics have a mixed variety of cassettes on hand. Accordingly, there must be careful matching of cassette and holders to produce good diagnostic results. If there is to be flexibility in which cassettes may be used a significant inventory of cassette holders is needed. Moreover, if it is desired to have a selection of grid bar to space ratios, other grid-channel assemblies have to be stocked to fit each cassette thickness. Inventorying the multitude of holders or grid-channel assemblies required is expensive and their use is time consuming because of the holder-cassette matching required.

An x-ray grid adapter in which adjustable rails are rigidly secured to a grid has been proposed. The rails were to be adjustable to accept cassettes of varying thickness. The operator would take the time, when using such a device, to readjust the rails to receive a new cassette having a different thickness. Also, if it were desired to use a grid having a different ratio, another grid-channel assembly would have to be stocked. When the new grid was used, the rails of the new grid would have to be adjusted to receive the cassette being used.

DISCLOSURE OF THE INVENTION

The present invention provides a new and improved cassette grid mounting apparatus or holder. The apparatus is designed to permit easy interchanging of grids and utilization of cassettes having various thicknesses without requiring expensive grid-channel assemblies.

The apparatus of the invention is for holding an x-ray grid and a cassette. The apparatus includes a rigid frame assembly including a pair of side rails. The side rails each have a plurality of flanges defining a set of grid supporting channel portions and a set of cassette channel portions. A bias means is provided for holding a positioned cassette firmly in the cassette channel.

The rigid frame assembly is dimensioned to correspond to the length and width of a cassette and a correspondingly sized grid to be used. In addition to the pair of side rails, the frame assembly includes a back rail. The side rails and the back rail each have a central flange portion which is spaced above a lower flange portion and these portions collectively define a grid channel. Each rail also has a top flange portion spaced above the central flange portion so that the center and top flange portions collectively define a cassette channel. The spacial relationship between the central and top flanges is sufficient to receive any commercially available cassette of the appropriate length and width dimensions and of any thickness.

A pair of parabolic springs are respectively fixedly attached near one end to a corresponding side wall cassette flange. Each spring extends from its top flange into the cassette channel. The purpose of the springs is to bias a cassette of any thickness dimension against the central flange. The thicker the cassette used, the more the spring will deform to receive the cassette when it is slid in the cassette channel.

Another feature of the present invention is the provision for a cassette tray. The cassette is placed upon the cassette tray prior to insertion into the cassette channel. The cassette tray protrudes from the apparatus and facilitates the insertion and removal of the cassette.

A further feature of the present invention is that fibrous members are located within the side rail portions of the grid channel in order to cushion and properly align the grid with the cassette.

Yet another feature of the present invention is the provision for a tubular elastomeric member located in the back rail portion of the grid channel to cushion and locate the grid so that the grid is properly aligned with the cassette.

Still another feature of the present invention is the coating of the parabolic springs with a polymer material to inhibit damage to the cassette during insertion or removal.

A still further feature of the present invention is the provision of retainer members located near the ends of each of the side rails grid channel portions to prevent the grid from accidently falling out of the holder.

Several advantages are realized by using the present invention over devices heretofore known. One advantage is that an appropriately sized grid of any given strip to space ratio can be combined with a correspondingly sized cassette of any given thickness in order to form a grid-cassette assembly.

Another advantage of the present invention is that the cassette holder allows removal and insertion of the cassettes for multiple exposures without having to move the patient or the holder.

Still another advantage of the present invention is that it eliminates the need for expensive, duplicate, grid-cassette holders since the operator can build his own grid-cassette combination using any complementally sized grid and any cassette combination and no size adjustments are necessary.

Other features and advantages and a fuller understanding of the invention will be had from the following detailed description and the accompanying drawings.

BEST MODE FOR CARRYING OUT THE INVENTION

Figure 1:
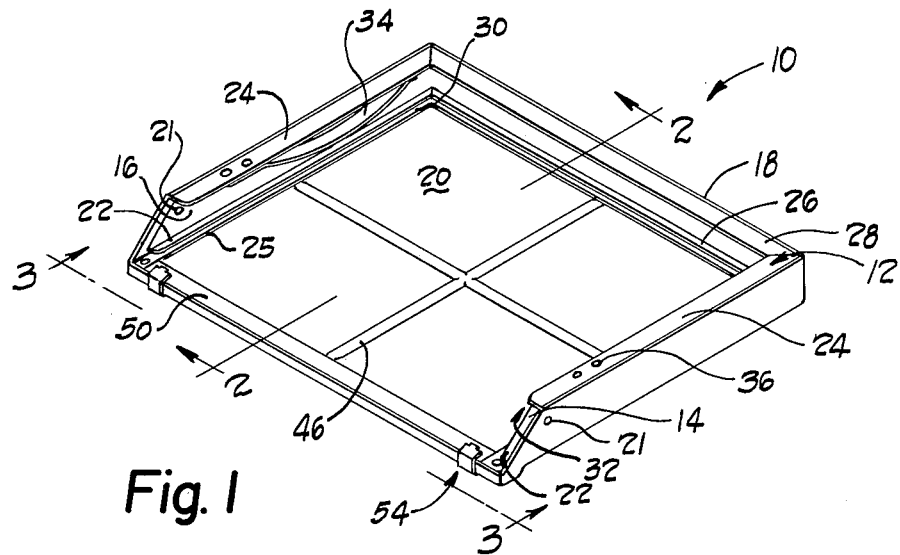
FIG. 1 is a perspective view of the grid cassette holder of the present invention.
Figure 2:
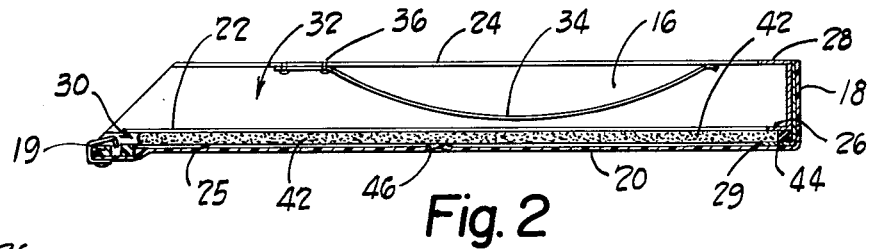
FIG. 2 is a sectional view as seen from the plane indicated by the line 2—2 of FIG. 1.
Figure 3:
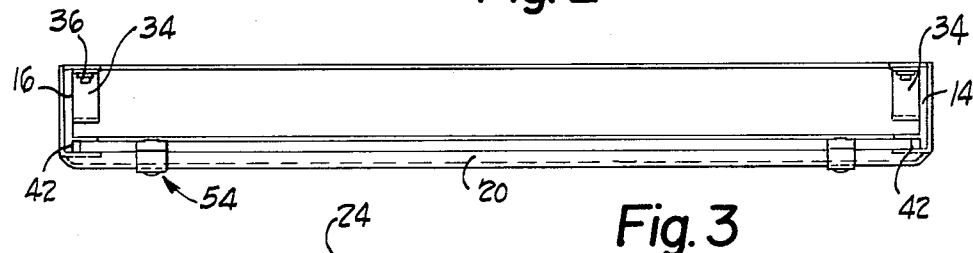
FIG. 3 is an elevational view as seen from the plane indicated by the line 3—3 of FIG. 1.
Figure 4:
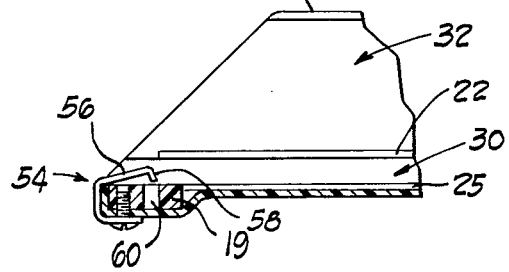
FIG. 4 is an enlarged, exploded view of a portion of FIG. 2 showing grid retainer clips.
Figure 5:
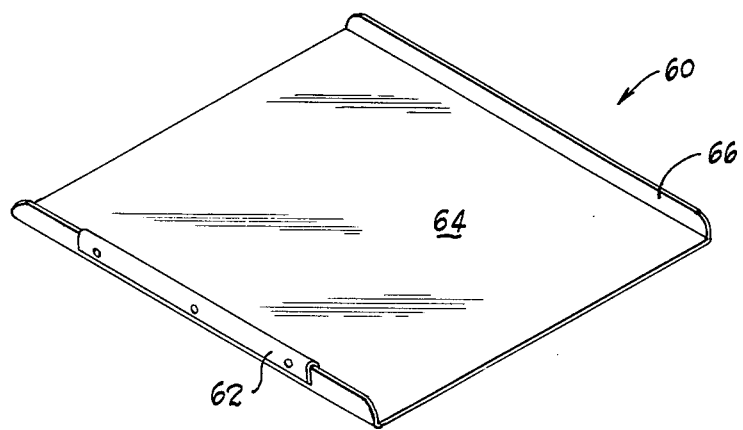
FIG. 5 is a perspective view of the cassette tray of the present invention.
Figure 6:
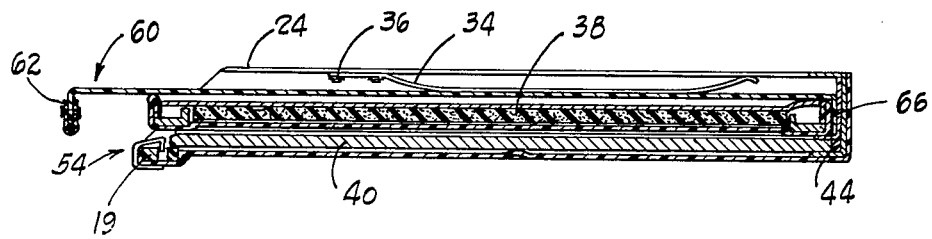
FIG. 6 is a sectional view of the holder of the present invention showing a cassette, a cassette tray, and a grid inserted in it.

Referring to the drawings, a cassette-grid holder is shown generally at 10. The holder includes a rigid frame assembly shown generally at 12 and preferably made of aluminum. A spaced pair of extruded side rails 14, 16 form a portion of the frame assembly 12. A back rail 18 of the same extrusion material as the side rails forms a back portion of the frame assembly 12 and is connected to side rails 14, 16. A cross brace 19 spans the front of the frame and is connected to the side rails. Thus, the cross brace and rails collectively provide a unitary, rigid, frame assembly.

The bottom and exterior side surfaces of the frame assembly 12 are protected and decorated by (and the opening delineated by the cross brace 19, the side rails 14, 16 and the back rail 18 is closed by) an essentially x-ray transparent cover 20 of a polymer material. The cross brace is disposed in a recessed portion of the cover. The opening delineated by the cross brace and rails is an x-ray beam transmittal area through which an image producing beam passes when the holder is in use.

Preferably the polymer cover 20 is thermally formed and then positioned over the frame assembly. It is secured in place with an adhesive if desired and rivets 21 on opposite sides near the top and front of the side rails. The frame assembly and the cover together constitute a frame and housing structure which may be a unitary molded or cast piece.

The side rails 14, 16 each have center, top and bottom flanges 22, 24, 25. The back rail 18 has center, top and bottom flanges 26, 28, 29 which correspond with, and are respectively coplanar with the center, top and bottom flanges of the side rails. The center and bottom flanges together form a grid supporting channel 30. The center and top flanges together define the top and bottom of a cassette supporting channel 32.

The length and width dimensions of the channels 30, 32 approximately correspond with the length and width dimensions of a cassette and a complementally sized grid to be used. The height dimension of grid channel 30 approximately corresponds to the height of commercially available grids. The height of the cassette channel 32 is preferably greater than the height of any commercially available cassette having the length and width dimensions of cassettes to be used with the holder.

In order to hold a cassette in a stationary position, a pair of parabolic springs 32 are respectively located within side rail defined portions of the cassette channel 32. Each spring is preferably fixedly attached to an associated one of the side rail flanges, preferably the top flange 24. Rivets 36 are provided for attaching each spring near one end.

Each spring 34 extends down into its associated side rail portion of the cassette channel 32 and makes tangential contact with, or comes within close proximity to, the associated central flange 22. Each spring extends back up to come into tangential contact with the associated top flange 24.

When a cassette 38 is slid into the cassette channel 32, the springs 34 will compress and apply spring bias forces against the cassette. The cassette 38 will be forced against the flanges 22, thus holding the cassette firmly in position. Thus, the cassette channel will hold and position any cassette independent of its thickness.

The grid channel 30 is preferably dimensioned to hold a standard grid 40. A pair of side retainer members 42 are provided which are respectively located in the side rail portions of the grid channel. The retainer members 42 are preferably a nylon pile material. A back retainer member 44 is provided in the back rail portion of the grid channel. The back retainer member is preferably a tubular elastomeric material. The retainer members 42, 44 provide the function of cushioning and locating the grid 40 with respect to the cassette 38 so that the two are properly aligned.

The cover includes ribs or raised surfaces 46. The raised surfaces 46 lie flush with the frame cross brace 19 and the lower flange portions. Thus when the grid 40 is slid into grid channel 30, the raised surfaces 46 act as supports for the grid.

To further facilitate grid insertion and removal, a wear tape 50 covers the cross brace 19 to aid in preventing the marring of the grid when the grid is slid into or out of position. In addition the spring members 34 are preferably coated with polymer material in order to inhibit scratching of a cassette when it is slid into or out of cassette channel 32.

A pair of grid retainer members 54 are fixed to the cross bar 19 and the frame 12 and extend partially up into the planes of the grid channel 30. The members are preferably made of spring steel and each has an inclined surface 56 and a stop surface 58. The cross brace 19 has a pair of holes 60 each aligned and dimensioned to receive an associated one of the stop members 58 when force is applied against the inclined surface 56. When a grid 40 is slid into the grid channel 30, the grid will apply a force to the inclined surfaces 56 thus forcing the stop surfaces 58 into the holes 60. The grid will then freely slide into the grid channel 30. Once the grid 40 passes completely over the retainer members 54, the members will return to their original positions. The stop surfaces 58 will be in proximate engagement with the grid 40 thus preventing the grid 40 from sliding out of the grid channel 30. When the grid 40 is removed, the retainer members 54 are depressed and the grid 40 can be slid out of the grid channel 30.

A cassette tray 60 that has a handle 62, a cassette holding surface 64 and a back wall 66 is provided. The cassette 38 can be placed upon the cassette surface 64. The cassette tray 60 can then be slid into channel 32. The cassette 38 can be easily pushed by the operator until it comes in contact with the back wall 66 of the tray. When it is desired to change the cassette, cassette tray 60 can be easily removed by use of handle 62 with the back wall functioning as a cassette extractor.

As those skilled in the art will appreciate, the present invention provides an apparatus for holding an x-ray grid and cassette of specified and complemental lengths and widths. The cassette channel is designed to accept any cassette independent of thickness. Any combination of a grid and cassette of appropriate length and width dimensions can be assembled by use of the holder of the present invention. It is also contemplated that a cassette or a grid can be held individually without the other.

Other modifications and variations of the invention will be apparent to those skilled in the art in view of the foregoing detailed disclosure. Therefore, it is to be understood that, within the scope of the appended claims, the invention can be practiced otherwise than as specifically shown and described.

I claim:

1. A portable radiographic cassette and grid holder for use in hospital emergency rooms or the like comprising a housing and frame structure, the housing and frame structure including:
   (a) a pair of side rail portions and a back rail portion each including a plurality of flanges and collectively defining spaced and parallel grid and cassette holding channels, the rail portions at least partially surrounding a beam transmittal area through which a radiograph producing x-ray beam is transmitted to expose a film when the holder is in use;
   (b) a bracing means interposed between the side rail portions and also partially bounding said beam transmittal area;
   (c) a cover spanning said area and formed of a material which is essentially transparent to a radiographic producing beam and also providing protection for grid carried by the holder, said cover defining an exterior surface extending between said side rail portions, back rail portion and bracing means; and
   (d) a pair of spaced springs each mounted in a different side rail portion of the cassette channel.

2. The holder of claim 1 wherein the cover also includes portions covering and protecting exterior surfaces of the rail portions.

3. The holder of claim 1 wherein the cover includes integrally formed ribs for reinforcing the cover and supporting the grid.

4. A portable radiographic cassette and grid holding apparatus, comprising:
   (a) a frame and rail structure;
   (b) the structure including side rails, the side rails each having a plurality of flanges defining grid and cassette channel portions;
   (c) said structure further including a back rail fixed to said side rails, the back rail having a plurality of flanges corresponding to and aligned with said side rail flanges, said flanges of said back rail defining further grid and cassette channel portions;
   (d) spring biasing means for holding a positioned cassette firmly in said cassette channel; and,
   (e) a cassette tray insertable in and removable from said frame and rail structure for aiding in the inserting and removal of a cassette to and from said cassette channels, said cassette tray located intermediate said cassette and said spring bias means such that a spring biasing force exerted by said spring bias means urges said tray into clamping engagement with said cassette, said cassette tray further including a back wall engageable with one end of said cassette.

5. The apparatus of claim 1 wherein each spring bias means is a parabolic resilient member preferably fixed near one end to one of the flanges defining one of said cassette channel portions.

6. A portable radiographic image providing apparatus for use in hospital emergency rooms or the like comprising:
   (a) a cassette and grid holder comprising a housing and frame structure, the housing and frame structure including:
      (i) a pair of side rail portions and a back rail portion each including a plurality of flanges and collectively defining spaced and parallel grid and cassette holding channels, the rail portions at least partially surrounding a beam transmittal area through which a radiograph producing x-ray beam is transmitted to expose a film when the apparatus is in use;
      (ii) a bracing means interposed between the side rail portions and also partially bounding said beam transmittal area;
      (iii) a material which is essentially transparent to a radiographic producing beam spanning said area and providing protection for a grid carried by the holder; and
      (iv) a pair of spaced springs each mounted in a different side rail portion of the cassette channel;
   (b) a cassette in the cassette channel and biased against a selected flange by said springs whereby accurately to position a film carried by the cassette and firmly to retain the cassette irrespective of the cassette thickness;
   (c) a grid in the grid channel and interposed between the cassette and the cover; and
   (d) a cassette tray carried by the holder and having cassette extraction portions overlying the cassette and adapted to engage the cassette and assist in extracting it from the cassette channel when the cassette is removed from the holder, the tray also including a handle, the cassette being positioned between the tray and the grid so that a radiographic image producing x-ray beam will not be filtered by the tray when the apparatus is in use.

7. The apparatus of claim 6 further including at least one grid retaining member for maintaining said grid in said grid channel, said retaining member including an abutment that is resiliently displaceable to a position at least flush with a plane of said grid to enable said grid to be inserted into said grid channel.

8. The apparatus of claim 6 wherein the material is a part of a cover also including portions covering and protecting exterior surfaces of the rail portions.

9. The apparatus of claim 6 wherein the material includes integrally formed ribs for reinforcing the material and supporting the grid.

* * * * *